United States Patent [19]

Chang et al.

[11] Patent Number: 4,613,451

[45] Date of Patent: Sep. 23, 1986

[54] GELABLE BLENDS OF ORGANOSILICON-CONTAINING MATERIALS AND HYDROPHOBIC POLYOLS

[75] Inventors: Wen-Hsuan Chang; David T. McKeough, both of Gibsonia, Pa.

[73] Assignee: PPG Industries, Inc., Pittsburgh, Pa.

[21] Appl. No.: 462,590

[22] Filed: Jan. 31, 1983

[51] Int. Cl.[4] ............................................. C09K 3/00
[52] U.S. Cl. ................................. 252/182; 524/100; 524/783; 528/18; 528/29
[58] Field of Search ............... 252/182; 528/18, 29; 524/100, 783

[56] References Cited

U.S. PATENT DOCUMENTS

| | | | |
|---|---|---|---|
| 2,048,799 | 7/1936 | Lawson | 260/96 |
| 2,630,446 | 3/1953 | Gresham | 260/448.8 |
| 2,877,202 | 3/1959 | Olson | 260/45.4 |
| 2,911,386 | 11/1959 | Olson et al. | 260/46.5 |
| 2,917,467 | 12/1959 | Olson et al. | 260/2 |
| 3,150,116 | 9/1964 | Masters | 260/47 |
| 3,154,597 | 10/1964 | McWhorter | 260/824 |
| 3,388,101 | 6/1968 | Wismer et al. | 260/77.5 |
| 3,429,851 | 2/1969 | Coates et al. | 260/46.5 |
| 3,539,658 | 11/1970 | Sekmakas et al. | 260/827 |
| 3,624,014 | 11/1971 | Moore et al. | 260/18 S |
| 3,917,648 | 11/1975 | McLeod | 260/32.8 SB |
| 3,932,339 | 1/1976 | McLeod | 260/32.8 SB |
| 3,997,501 | 12/1976 | McLeod | 260/37 SB |
| 4,013,698 | 3/1977 | Lohse et al. | 260/448.8 R |
| 4,069,178 | 1/1978 | Mikami et al. | 260/22 S |
| 4,093,673 | 6/1978 | Chang et al. | 260/824 EP |
| 4,243,767 | 1/1981 | Kaufman et al. | 525/102 |
| 4,302,571 | 11/1981 | Arai et al. | 528/32 |
| 4,501,872 | 2/1985 | Chang et al. | 528/18 |

*Primary Examiner*—Josephine L. Barr
*Attorney, Agent, or Firm*—Thomas M. Breininger

[57] ABSTRACT

Disclosed is a liquid composition comprising a mixture of (A) a hydrophobic polyol, and (B) an organosilicon-containing material. The organosilicon-containing material is substantially free of unhydrolyzed aminoalkylsilane and comprises an organosilicon-containing substance free of functional groups attached to carbon and essentially free of alkali metal ions. The organosilicon-containing substance has atoms bonded directly to silicon all of which are selected from O, N, and/or Cl. The silicon-containing substance additionally has moieties directly bonded to Si which are displaceable by reaction with water and/or alcohol. At least a part of the silicon-containing substance is hydrolyzed to a compound or a mixture of compounds which contains a residual amount of the moieties directly bonded to Si which are displaceable by reaction with water and/or alcohol.

After components (A) and (B) are mixed, the composition is a homogeneous liquid which is capable of self-curing to a continuous film by reaction, with moisture and/or the hydrophobic polyol, of the residual moieties bonded directly to silicon which are displaceable by reaction with water and/or alcohol.

27 Claims, No Drawings

GELABLE BLENDS OF ORGANOSILICON-CONTAINING MATERIALS AND HYDROPHOBIC POLYOLS

BACKGROUND OF THE INVENTION

Given the increasing costs and scarcity of petroleum based energy sources and concern over the possible harmful effects of high concentrations of various volatile organic solvents in the environment, there has arisen a need in the coatings industry for coating compositions which contain ever lower concentrations of volatile organic components and which are based to an ever decreasing degree on expensive petroleum based components.

However, previous approaches to meet both of the above challenges generally have involved compromises among desirable coating composition properties such as molecular weight of the principal film forming resin, application viscosity of the composition, low curing temperature, and desirable properties of the cured film such as water resistance, flexibility, hardness, solvent resistance, etc.

It would be desirable to produce coating materials which contain low levels of organic solvents, cure at low temperatures, have low application viscosities, do not generate highly toxic volatile materials upon curing, contain less petroleum based components, and yet cure to produce films having desirable features at least as good as conventional, cured films.

SUMMARY OF THE PRESENT INVENTION

A liquid composition of the present invention comprises a mixture of component (A) a hydrophobic polyol and component (B) an organosilicon-containing material which is substantially free of unhydrolyzed aminoalkylsilane. The term "mixture" as it refers to the combination of (A) and (B) is understood to mean a blend of components (A) and (B) which at room temperature does not separate into layers.

The organosilicon-containing material comprises an organosilicon-containing substance having atoms bonded directly to Si all atoms of which are selected from the group consisting of oxygen, nitrogen and/or chlorine. The organosilicon-containing substance also has moieties directly bonded to Si which are displaceable by reaction with water and/or alcohol. At least a part of the organosilicon-containing substance is hydrolyzed. Generally, some of the hydrolysis products will be condensed to the corresponding siloxane moieties containing one or more siloxane linkages

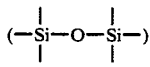

per molecule and containing a residual amount of the moieties directly bonded to silicon which are displaceable by reaction with water and/or alcohol.

A composition of the invention can be in the form of a two-pack composition, one pack containing the hydrophobic polyol and another pack containing the organosilicon-containing material. A composition of the invention can be in the form of a one-pack composition with the hydrophobic polyol and organosilicon-containing material in the same pack or container.

After the hydrophobic polyol (component A) and the organosilicon-containing material are mixed, the resulting composition is a liquid which can be self-cured, typically in the presence of a catalyst, to a continuous film by reaction of residual moieties from the organosilicon-containing material which are displaceable with moisture and/or with the hydroxyl moieties from the hydrophobic polyol.

DETAILED DESCRIPTION OF THE INVENTION

A liquid composition of the present invention is useful for coating a substrate and comprises a mixture of components:

(A) at least one hydrophobic polyol; and (B) an organosilicon-containing material which is substantially free of unhydrolyzed aminoalkylsilane comprising (1) at least one organosilicon-containing substance free of functional groups attached to carbon and essentially free of alkali metal ions, having atoms bonded directly to Si all of which atoms are selected from the group consisting of O, N, and/or Cl, the organosilicon-containing substance additionally having moieties directly bonded to Si which are displaceable by reaction with water and/or alcohol, wherein at least a part of the organosilicon-containing substance is hydrolyzed to a compound or a mixture of compounds containing a residual amount of the moieties directly bonded to silicon which are displaceable by reaction with water and/or alcohol;

(2) optionally a nonfunctional organosilane, a hydrolyzed nonfunctional organosilane or a mixture thereof; and (3) optionally a functional organosilane, a hydrolyzed functional organosilane, or a mixture thereof, which functional organosilane is not an aminoalkylsilane;

wherein after components (A) and (B) are mixed, the liquid composition is homogeneous and is capable of self-curing to a continuous film, optionally in the presence of a catalyst, by reaction, with moisture and/or hydroxyl moieties from the hydrophobic polyol, of moieties from the organosilicon-containing material which are bonded directly to silicon and are displaceable.

Polyols suitable for preparing compositions of the present invention are polyols typically having a hydroxyl equivalent weight of from 45 to 1000, preferably of from 59 to 600. Typically the hydroxyl equivalent weight of polyols used to prepare resins of the invention for high solids coating compositions ranges from 59 to 500, preferably from 70 to 300. Diols are preferred for the hydrophobic polyol component for preparing compositions of the invention. The polyols typically are free of ethylenic unsaturation, typically contain at least 4 carbon atoms, typically are essentially free of phenolic hydroxyl moieties, and typically are essentially free of multiple 1,2-epoxy moieties such as contained in hydroxyl functional diepoxides. Preferably, at least a part of the polyol component contains nonvicinal hydroxyl groups, that is, hydroxyl groups which are bonded to carbon atoms which are separated from each other by at least 1 intervening carbon atom. A large amount of high molecular weight 1,2-glycols generally is undesirable in polyols used to prepare the compositions of the invention since the high molecular weight 1,2-glycols are believed to contribute to the formation of a high yield of cyclic moieties during curing of the compositions. Additionally, polyols containing hydroxyl moieties separated from each other by only three carbon atoms are also undesirable for similar reasons. A large amount of low molecular weight 1,2-glycols, such as ethylene and propylene glycol, also is undesirable since such glycols tend to volatilize during cure and therefore prevent the formation of a continuous, water resistant film if no hydrophobic polyol is present in the composition. However, an amount of such diol moieties insufficient to adversely affect the cure response and properties of the cured film can be employed in the resins of the invention and sometimes may even be desirable.

The term "hydrophobic polyol" is intended to mean a polyol having limited compatibility with water as determined by the following procedure. Thirty parts by weight of polyol and 70 parts by weight of water are thoroughly mixed together at 80° Celsius (°C.) for 5 minutes. Upon cooling to room temperature, if the polyol/water mixture separates into two phases, the polyol is considered herein to be a hydrophobic polyol useful for the preparation of compositions of the invention. Polyols such as ethylene glycol when mixed with water according to the above procedure for determining hydrophobic polyols produce a homogeneous (i.e. single phase) mixture and are considered herein to be hydrophilic. Pure hydrophilic polyols are not desirable for preparation of the compositions of the invention because the resultant reaction product formed during curing will disadvantageously degrade either during curing or as the cured film either by evaporation or by hydrolysis to produce $SiO_2$. Thus, for example, such hydrophilic polyols often will not permit continuous films to be formed when compositions prepared from such polyols are cured.

An advantage of using hydrophobic polyols in the preparation of the compositions of the invention is that they enhance the hydrolytic stability of the oxygen to silicon bond

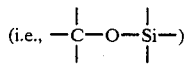

formed by the reaction of the hydroxyl moiety on the polyol with a reactive moiety on the organosilicon-containing material. Additionally, sterically hindering groups attached to carbon which is bonded through oxygen to silicon also are believed to contribute to hydrolytic stability of the oxygen to silicon bond. Hydrolytic stability of the aforementioned oxygen to silicon bond is believed to contribute to the resistance of cured coatings prepared from the compositions of the invention to degradation by water either in the form of liquid water or water vapor. The organic components of compositions of the invention surprisingly stay in cured films prepared from these compositions. Additionally, cured coatings prepared from compositions of the present invention generally have excellent humidity resistance. It is also believed that the utilization of hydrophobic polyols enables the compositions of the invention to function as durable, protective film formers per se. This is to be contrasted with organosilicate-containing resins based on low molecular weight, highly volatile, hydrophilic polyols, for example, ethylene glycol, for which the organic portion essentially leaves the film when the resin is thermally cured. Thus a polyol, such as ethylene glycol, which is hydrophilic, has 1,2-glycol groups, is highly volatile, and can be considered to be a leaving group, represents a polyol having a combination of very undesirable properties which makes the use of significant amounts of such polyol undesirable for preparing a composition of the present invention. A significant amount of ethylene glycol, for example, would represent more than 50 percent by weight of the polyol component (A). However, less than 30 percent by weight of a polyol such as ethylene glycol can be used in preparing a composition of the invention and may even be desirable to the extent that it represents a good leaving group on curing without contributing to undesirable properties in the resultant cured film prepared from a composition of the invention.

Examples of polyols useful in the preparation of compositions of the present invention include the hydrophobic polyols in the broad classes including: simple diols, triols, and higher hydric alcohols; polyester polyols optionally modified with a fatty acid: polyether polyols; amide containing polyols; and polyurethane polyols.

The simple diols, triols, and higher hydric alcohols useful in the preparation of the compositions of the invention are generally known, examples of which include: 1,2-butanediol; 1,4-butanediol; 1,3-butanediol; 2,2,4-trimethyl-1,3-pentanediol; 1,5-pentanediol; 2,4-pentanediol; 1,6-hexanediol; 2,5-hexanediol; 2-methyl-1,3-pentanediol; 2-methyl-2,4-pentanediol; 2,4-heptanediol; 2-ethyl-1,3-hexanediol; 2,2-dimethyl-1,3-propanediol; 1,4-cyclohexanediol; 1,4-cyclohexanedimethanol; 1,2-bis (hydroxymethyl) cyclohexane; 1,2-bis (hydroxyethyl) cyclohexane; 2,2-dimethyl-3-hydroxypropyl-2,2-dimethyl-3-hydroxypropionate; dipropylene glycol; the alkoxylation product of 1 mole of 2,2-bis (4-hydroxyphenyl) propane (i.e., bisphenol-A) and 2 moles of propylene oxide available as DOW-565 from DOW Chemical Company; and the like. Of the above simple diols, triols, and higher hydric alcohols, less desirable are dipropyleneglycol and 1,3 type diols such as 1,3-butanediol, 2,2,4-trimethyl-1,3-pentanediol, 2,4-pentanediol, 2-methyl-1,3-pentanediol, 2-methyl-2,4-pentanediol, 2,4-heptanediol, 2-ethyl-1,3-hexanediol, and 2,2-dimethyl-1,3-propanediol when employed as the sole polyol component because of the tendency of some of these diols also to form cyclic moieties during reaction with the organosilicon-containing material and because some of these diols are on the borderline of being hydrophilic as determined by the test for hydrophobicity described above.

Hydrophobic polyester polyols useful in the preparation of compositions of the invention are generally known and are prepared by conventional techniques utilizing simple diols, triols and higher hydric alcohols known in the art including but not limited to the previously described simple diols, triols, and higher hydric alcohols (optionally in combination with monohydric alcohols) with polycarboxylic acids, optionally polycarboxylic acids essentially free of ethylenic unsaturation. As used herein, the phrase "polycarboxylic acids essentially free of ethylenic unsaturation" is intended to include acids containing aromatic unsaturation but essentially no ethylenic unsaturation. Examples of suitable polycarboxylic acids include: phthalic acid; isophthalic acid; terephthalic acid; trimellitic acid; tetrahydrophthalic acid, hexahydrophthalic acid; tetrachlorophthalic acid; adipic acid, azelaic acid, sebacic acid; succinic acid; malic acid; glutaric acid; malonic acid; pimelic acid; suberic acid; 2,2-dimethylsuccinic acid; 3,3-dimethylglutaric acid; 2,2-dimethylglutaric acid; maleic acid, fumaric acid, itaconic acid; and the like. Anhydrides of the above acids, where they exist, can also be employed and are encompassed by the term "polycarboxylic acid". In addition, certain materials which react in a manner similar to acids to form polyester polyols are also useful. Such materials include lactones such as caprolactone, propylolactone and methyl caprolactone, and hydroxy acids such as hydroxy caproic acid and dimethylolpropionic acid. If a triol or higher hydric alcohol is used, a monocarboxylic acid, such as acetic acid and benzoic acid, may be used in the preparation of the polyester polyol, and for some purposes, such a polyester polyol may be desirable. Moreover, the term polyester polyols as used herein is intended to encompass polyester polyols optionally modified with fatty acids or glyceride oils of fatty acids (i.e., conventional alkyd polyols containing such modification). A preferred way of making a polyester polyol suitable for a composition of the invention is to react an alkylene oxide such as ethylene oxide, propylene oxide, butylglycidyl ether, and the glycidyl esters of organic acids such as CARDURA-E, with the carboxylic acid to form the corresponding ester. By this method, there is essentially no vicinal hydroxyl groups in the resulting polyol product.

Examples of the optional monohydric alcohols which may be used to prepare the polyester polyols include: ethanol, propanol, isopropanol, n-pentanol; neopentyl alcohol; 2-ethoxyethanol; 2-methoxyethanol; 1-hexanol; cyclohexanol; 2-methyl-2-hexanol; 2-ethylhexyl alcohol; 1-octanol, 2-octanol, 1-nonanol; 5-butyl-5-nonanol, isodecyl alcohol, and the like. Usually, the hydrophobic properties of the cured composition can be enhanced by employing monoalcohols containing more than four carbon atoms.

Hydrophobic polyether polyols which may be used in the preparation of compositions of the invention are generally known. Examples of hydrophobic polyether polyols include the poly-(oxypropylene) glycols prepared by the acid or base catalyzed addition of propylene oxide to propylene glycol or dipropylene glycol initiators and by the copolymerization of propylene oxide and ethylene oxide with initiator compounds such as trimethylolpropane, glycerol, pentaerythritol, sorbitol, sucrose and the like. The hydrophobic polyether polyols also include the generally known poly(oxytetramethylene) glycols prepared by the polymerization of tetrahydrofuran in the presence of Lewis acid catalysts such as boron trifluoride, tin (IV) chloride, antimony pentachloride, antimonytrichloride, phosphorous pentafluoride, and sulfonyl chloride. Other examples of hydrophobic polyether polyols include the generally known reaction products of 1,2-epoxidecontaining compounds with polyols such as those included in the description of simple diols, triols, and higher hydric alcohols above.

Hydrophobic amide-containing polyols are generally known and typically are prepared from any of the above-described diacids or lactones and diols, triols and higher alcohols, and diamines or aminoalcohols as illustrated, for example, by the reaction of neopentyl glycol, adipic acid and hexamethylenediamine. The amide-containing polyols also may be prepared through aminolysis by the reaction, for example, of carboxylates, carboxylic acids, or lactones with aminoalcohols. Examples of suitable diamines and aminoalcohols include hexamethylenediamine, ethylenediamine, phenylenediamines, toluenediamines, monoethanolamine, diethanolamine, N-methylmonoethanolamine, isophorone diamine, 1,8-menthanediamine and the like.

Hydrophobic polyurethane polyols are generally known. Polyurethane polyols useful in the present invention can be produced by reacting any of the above-described polyols, including diols, triols, and higher alcohols, polyester polyols, polyether polyols, and amide-containing polyols with an organic polyisocyanate. The organic polyisocyanate may be reacted with the polyol either directly to form the polyurethane polyol or by the generally known prepolymer technique wherein the polyol and polyisocyanate are reacted in relative proportions to first produce an isocyanate terminated prepolymer with subsequent reaction of the prepolymer with additional polyol to form the polyurethane polyol. Also, mixtures of organic isocyanate prepolymers with monomeric isocyanates (so-called semi-prepolymers) may be employed in the prepolymer technique. In general, urethane formation improves the hydrophobicity of polyols.

The polyisocyanate which is reacted with the polyol essentially can be any organic polyisocyanate. The polyisocyanate may be aromatic, aliphatic, cycloaliphatic, or heterocyclic and may be unsubstituted or substituted with groups such as halogen, etc. Many such organic polyisocyanates are known, examples of which include: toluene-2,4-diisocyanate, toluene-2,6-diisocyanate, and mixtures thereof; diphenylmethane-4,4'-diisocyanate, diphenylmethane-2,4'-diisocyanate and mixtures thereof; p-phenylene diisocyanate; biphenyl diisocyanate; 3,3'-dimethyl-4,4'-diphenylene diisocyanate; tetramethylene-1,4-diisocyanate; hexamethylene-1,6-diisocyanate; 2,2,4-trimethylhexane-1,6-diisocyanate; lysine methyl ester diisocyanate; bis (isocyanatoethyl) fumarate; isophorone diisocyanate; ethylene diisocyanate; dodecane-1,12-diisocyanate; cyclobutane-1,3-diisocyanate; cyclohexane-1,3-diisocyanate, cyclohexane-1,4-diisocyanate and mixtures thereof; methylcyclohexyl diisocyanate; hexahydrotoluene-2,4-diisocyanate, hexahydrotoluene-2,6-diisocyanate and mixtures thereof; hexahydrophenylene-1,3-diisocyanate, hexahydrophenylene-1,4-diisocyanate and mixtures thereof; perhydrodiphenylmethane-2,4'-diisocyanate, perhydrodiphenylmethane-4,4'-diisocyanate and mixtures thereof. It is to be understood that mixtures of polyisocyanates and monoisocyanates may be utilized as the polyisocyanate for preparing the hydrophobic polyurethane polyols.

Hydrophobic polyester polyols containing modification by fatty acids (commonly referred to as alkyd polyols) which optionally may be used in the preparation of compositions of the invention are generally known. However, hydrophobic alkyd polyols are less desirable than the hydrophobic polyols described previously. As used herein, the term "alkyd polyols" refers to alkyd resins containing hydroxyl functionality. They typically are produced by reacting polyhydric alcohols, polycarboxylic acids, and fatty acids derived from drying, semi-drying or non-drying oils in various proportions depending upon the extent of hydroxyl functionality and properties desired in the alkyd polyol. The techniques of preparing alkyd resins are well-known generally. Usually, the process involves reacting together the polycarboxylic acid and fatty acid or a partial glyceride thereof and the polyhydric alcohol (the latter usually in stoichiometric excess) in the presence of a catalyst such as litharge, sulfuric acid, or sulfonic acid to effect esterification with evolution of water. Examples of polyhydric alcohols typically used for preparation of the alkyd polyols include the simple diols, triols and higher hydric alcohols known in the art including but not limited to the previously described simple diols, triols, and higher hydric alcohols. Examples of polycarboxylic acids suitable for preparation of the alkyd polyols include those set forth previously in the description of polycarboxylic acids useful for preparing the hydrophobic polyester polyols in general. Examples of suitable fatty acids include saturated and unsaturated acids such as stearic acid, oleic acid, ricinoleic acid, palmitic acid, linoleic acid, linolenic acid, licanic acid, elaeostearic acid, clupanodonic acid and mixtures thereof. The fatty acids may be in the form of the free acids with sufficient excess of the polyhydric alcohol being incorporated into the esterification mixture to compensate for their inclusion. However, in many instances, it is preferred to employ glyceride oils which have been partially alcoholized with a sufficient amount of a polyhydric alcohol such as glycerol to supply the requisite amount of available hydroxyls for the formation of the alkyd polyol.

As stated previously, a composition of the invention contains the hydrophobic polyol and an organosilicon-containing material comprising an organosilicon-containing substance (defined herein), optionally a nonfunctional organosilane (defined herein), and optionally a functional organosilane (defined herein). Very often organosilicon-containing materials are not compatible at room temperature with polyols. An organosilicon-containing material which is incompatible with a polyol, when mixed at room temperature with the polyol, separates into layers. In one desirable embodiment of the invention, it has been found that cohydrolysis products of the organosilicon-containing substance (and/or precursors thereof such as suitable monomeric compounds) with nonfunctional and/or functional organosilane (in monomeric or hydrolyzed form) tend to be more compatible with the hydrophobic polyols at room temperature and are therefore especially desirable for use as organosilicon-containing materials in compositions of the invention. For example, the employment of such cohydrolysis products allows for preparation of compositions of the invention either with substantial reduction of, or preferably elimination of, the use of organic solvents employed to render the components of the compositions more compatible. Additionally, the rather low viscosities of organosilicon-containing materials utilized in compositions of the invention advantageously contribute to low viscosities of compositions of the invention thereby reducing, or preferably eliminating, the need for organic solvents to thin the compositions.

The organosilicon-containing substance required in the organosilicon-containing material is defined as follows. An organosilicon-containing substance useful in the invention is organic and is essentially free of alkali metal ions which distinguish it from generally known inorganic silicates such as alkali metal silicates including, for example, sodium orthosilicate. All atoms bonded directly to Si in the organosilicon-containing substance are selected from oxygen, nitrogen, and/or chlorine, preferably oxygen and/or nitrogen, most preferably all of such atoms being oxygen. Thus, silicon in the organosilicon-containing substance will be bonded to atoms other than O and/or N, such as C or another Si atom, through the O or N atoms. The organosilicon-containing substance additionally has moieties directly bonded to Si which are displaceable by reaction with water and/or alcohol. Examples of moieties directly bonded to Si which are displaceable by reaction with water and/or alcohols include

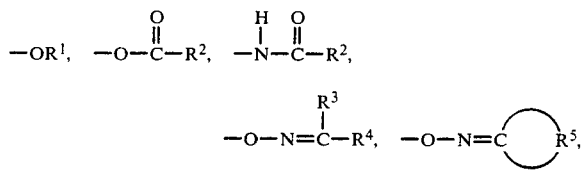

and the $C_2$ to $C_3$ residue of a 1,2 or 1,3-glycol,
wherein
$R^1$ represents $C_1$–$C_7$ alkyl, $C_6$–$C_8$ cycloalkyl, $C_6$–$C_8$ aryl, and $C_3$–$C_8$ alkoxyalkyl,
$R^2$ represents H or $C_1$–$C_4$ alkyl,
$R^3$ and $R^4$ independently represent H, $C_1$–$C_4$ alkyl, $C_6$–$C_8$ cycloalkyl or $C_6$–$C_8$ aryl, and
$R^5$ represents $C_4$–$C_7$ alkylene.

Preferably all of the moieties directly bonded to Si which are displaceable by reaction with water and/or alcohol are of the type represented by —$OR^1$ defined above, and most preferably are lower alkoxy moieties selected from the group consisting of methoxy, ethoxy, and propoxy. It will be appreciated that the oxygen atom in, for example, an ethoxy moiety attached to Si of course serves as an atom bonded directly to Si selected from O, N, and/or Cl discussed above. It is required that at least a part of the organosilicon-containing substance be hydrolyzed to a compound or a mixture of compounds. Generally, some of the hydrolysis products will be condensed to the corresponding siloxane materials containing one or more siloxane linkages

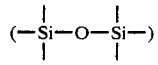

per molecule. The degree of hydrolysis of the hydrolyzed organosilicon-containing substance can conveniently be considered to be that degree of hydrolysis required to convert at least 10 percent, preferably at least 20 percent, and most preferably at least 30 percent by weight of the moieties directly bonded to Si which are easily displaceable theoretically to form silanol groups

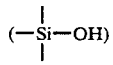

regardless of the actual degree of condensation of the silanol groups. For example, if tetraethylorthosilicate represented the silicon-containing substance, a degree of hydrolysis of 10 percent would mean that at least 10 percent by weight of the ethoxy moieties of the tetraethylorthosilicate could be thought to be theoretically converted to silanol groups regardless of the actual degree of condensation to siloxane containing compounds in the hydrolyzed product. Additionally, compounds or a mixture of compounds containing siloxane linkages in sufficient amounts to be considered to have been prepared theoretically from unhydrolyzed silicon-containing substances are defined herein, to at least a 10 percent, preferably at least 20 percent, and most preferably at least 30 percent degree of hydrolysis as defined above, regardless of the actual manner of preparation, are understood to fall within the definition of an organosilicon-containing substance at least a part of which is hydrolyzed to a compound or a mixture of compounds. Of course, the hydrolyzed organosilicon-containing substance must also contain a residual amount of the aforementioned moieties directly bonded to Si which are displaceable by reaction with water and/or alcohol.

It is also to be understood that the organosilicon-containing substances useful for the invention having atoms bonded directly to Si selected from O, N and/or Cl are essentially free of functional groups attached to carbon atoms such as isocyanate, epoxy, amino, etc. As will be apparent, the previously described moieties bonded directly to Si which are displaceable by reaction with water and/or alcohol do not fall into the category of functional groups referred to in the immediately preceding sentence.

By way of illustration, an especially desirable class of organosilicon-containing substances suitable in the invention include organosilicates which prior to hydrolysis correspond to the following formula, I,

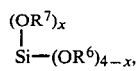
$$\begin{array}{c}(OR^7)_x\\|\\Si-(OR^6)_{4-x},\end{array} \quad (I)$$

wherein
$R^6$ represents methyl, ethyl or propyl,
$R^7$ represents alkyl containing at least 4 carbon atoms, aryl, alkylaryl, arylalkyl, aryloxyalkyl, or alkyloxyalkyl, and
x is an integer ranging from 0 to 3, preferably 0 or 1, and most preferably 0.

Examples of useful organosilicates include: tetramethoxysilane, tetraethoxysilane, tetra-n-propoxysilane, methoxytriethoxysilane, dimethoxydiethoxysilane, trimethoxy-n-propoxysilane, bis(2-ethylhexoxy)diethoxysilane, butoxytriethoxysilane, and the like. Mixtures of organosilicates also may be used as the organosilicon-containing substance.

Of the organosilicates corresponding to the formula I, above, the tetraalkoxysilanes wherein x equals 0 in formula I are preferred. The tetraalkoxysilanes provide a high degree of reactive groups to the compositions of the invention and enhance the ease with which the compositions of the invention can be cured. Additionally, the tetraalkoxysilanes are readily available at low cost. Furthermore, they can be used to attach modifying groups such as those represented by —OR$^7$ in formula I above, an example of which is a sec-butoxy group. Surprisingly, cured films produced from compositions of the invention prepared from the organosilicates are resistant to degradation by water such as water vapor or liquid water.

Of the examples of organosilicates described above, tetramethoxysilane is desirable for some purposes because of the ease with which it reacts with the hydroxyl moiety of the hydrophobic polyol. Tetraethoxysilane is especially desirable since, although tetraethoxysilane is not as reactive as tetramethoxysilane, it does not provide the possibility of toxicity problems that may be encountered with the use of tetramethoxysilane and is not as highly volatile as tetramethoxysilane.

Examples of organosilicon-containing substances other than the above organosilicates, which may be utilized in the invention, include tetraacetoxysilane, diethoxydiacetoxysilane, and

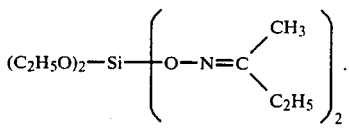

As stated previously, at least a part of the organosilicon-containing substance is hydrolyzed. Hydrolyzed organosilicon-containing substances provide increased reactive groups per molecule of organosilicon-containing material in compositions of the invention. Additionally, the hydrolyzed organosilicon-containing substances help provide low volatility to the compositions of the invention during curing.

Generally, some of the hydrolysis products will be condensed to the corresponding siloxane materials. These siloxane materials contain compounds containing one or more siloxane linkages represented by the formula, II, $$\begin{array}{c}|\quad\quad|\\-Si-O-Si-\\|\quad\quad|\end{array} \quad (II)$$

Usually these hydrolyzed and condensed organosilicon-containing substances are prepared in generally known manner by the hydrolysis of precursors which contain silicon atoms attached to substituents convertible to hydroxyl (i.e., silanol) groups. These hydrolysis reactions typically may be illustrated as, $$Si(X)_4 + H_2O = (X)_3SiOH + HX,$$

in which X can be an easily displaceable group such as $C_1$-$C_3$ alkoxy,

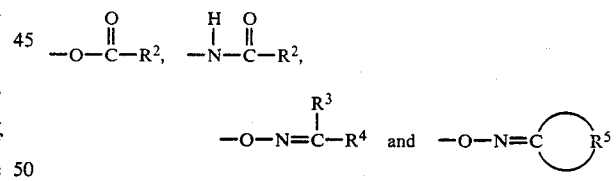

which groups are defined as above. The above silanol containing products often are condensed to produce one or more

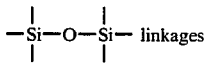 linkages linkages in the hydrolyzed and condensed organosilicon-containing substances. Of course, it should be understood that organosilicon-containing substances which are hydrolyzed are intended to include those hydrolyzed materials prepared from precursors which contain silicon atoms attached to hydrolyzable substituents other than the hydrolyzable groups defined above (represented by X in the equation above) such hydrolyzable substituents including, for example, halogen such as chloro. Such hydrolyzed materials prepared from precursors which contain silicon atoms attached to hydrolyzable halo substituents are substantially the same as those hydrolyzed materials prepared from precursors which contain silicon atoms attached to hydrolyzable groups X defined above, inasmuch as both types of precursors when hydrolyzed form silanol groups which can be condensed to form siloxane linkages.

It is also considered to be within the scope of the present invention to use mixtures of the organosilicon-containing substances and hydrolyzed organosilicon-containing substances as the organosilicon-containing material in a composition of the invention.

Some specific examples of hydrolyzed and condensed organosilicon-containing substances useful for preparing compositions of the invention include hexaethoxy disiloxane, octaethoxy trisiloxane and SILBOND-40, a hydrolyzed and condensed tetraethoxysilane available from Stauffer Chemical Company.

Where desired, organosilicon-containing substances and/or hydrolyzed organosilicon-containing substances containing higher alkoxy, aryloxy, arylalkyloxy, alkylaryloxy, alkyloxyalkoxy, and/or aryloxyalkyloxy moieties attached to one or more silicon atoms in addition to the required displaceable moieties may be employed in compositions of the invention. The term "higher alkoxy" is intended to mean an alkoxy group having at least 4 carbon atoms such as sec-butoxy, n-pentoxy, isopentoxy, neopentoxy, hexoxy, nonoxy, isodecyloxy and the like. Examples of aryloxy, arylalkyloxy, alkylaryloxy, alkyloxyalkyloxy, and/or aryloxyalkyloxy moieties include phenoxy, benzyloxy, phenylethoxy, tolyloxy, xylyloxy, 4-ethylphenoxy, phenoxyethoxy, 2-butoxyethoxy and the like. It is believed that the presence of such higher alkoxy, aryloxy, arylalkyloxy, alkylaryloxy, alkyloxyalkyloxy and/or aryloxyalkyloxy moieties from the organosilicon-containing material provides decreased volatility to the compositions of the invention and enhanced hydrolytic stability to cured films prepared from the compositions of the invention. However, the hydrolyzed organosilicon-containing substance should contain a residual amount of moieties directly bonded to Si which are displaceable by reaction with water and/or alcohol. Such displaceable moieties from the organosilicon-containing substance in addition to any of such displaceable moieties provided by optional nonfunctional organosilane (and/or hydrolyzed nonfunctional organosilane), and optional functional organosilane (and/or hydrolyzed functional organosilane) in the organosilicon-containing material should be in an amount sufficient that a composition of the invention which also contains the required hydrophobic polyol can be gelled according to the gel test described infra and such that the composition is capable of self-curing to a continuous film by reaction of such displaceable moieties with moisture and/or the hydroxyl moieties from the hydrophobic polyol. For example, when lower alkoxy moieties such as methoxy, ethoxy, or propoxy are the displaceable moieties provided by the organosilicon-containing material, the amount of such lower alkoxy moieties generally will range from 26 milliequivalents per gram to 5 milliequivalents per gram based on the total weight of organosilicon-containing material. It is of course to be understood that when a nonfunctional organosilane and/or a functional organosilane is included in the organosilicon-containing material in addition to the organosilicon-containing substance at least a part of which organosilicon-containing substance is hydrolyzed, that the nonfunctional and/or functional organosilane may be a partially hydrolyzed material, hydrolyzed either individually or in combination with the organosilicon-containing substance. Thus when organosilicate (corresponding to formula I) is utilized as organosilicon-containing substance in combination with nonfunctional and/or functional organosilane, the range of 26–5 milliequivalents of lower alkoxy moieties per gram of organosilicon-containing material includes any lower alkoxy moieties from the nonfunctional and/or functional organosilane whatever the degree of hydrolysis and condensation of the components of the organosilicon-containing material. Typically, the higher ratio by weight of higher alkoxy, aryloxy, arylalkyloxy, alkylaryloxy, alkyloxyalkyloxy, and/or aryloxyalkyloxy moieties to the displaceable moieties (such as lower alkoxy moieties) in the composition, the lower the cure response of the composition. By lower "cure response" is meant either a longer time at a given temperature, or a higher temperature for a given length of time, to cure the composition to a dry, tack free state.

Optionally, the organosilicon-containing material for the preparation of a composition of the invention optionally may comprise an organosilicon material selected from a nonfunctional organosilane, a partially hydrolyzed nonfunctional organosilane or a mixture thereof as well as cohydrolyzed products of the organosilicon material and the organosilicon-containing substance. These organosilicon materials can be utilized to help provide hydrophobicity to the organosilicon-containing material where desired. When the organosilicon-containing material does comprise such organosilicon material, the amount of such organosilicon material generally ranges from greater than 2 to less than 80 percent, preferably less than 50 percent, and most preferably less than 25 percent, by weight of the organosilicon-containing material. As used herein, a nonfunctional organosilane is understood to mean a material corresponding to the formula, III,

wherein
R$^8$ represents hydrogen, alkyl, aryl, alkylaryl, arylalkyl, or aryloxyalkyl;
X represents

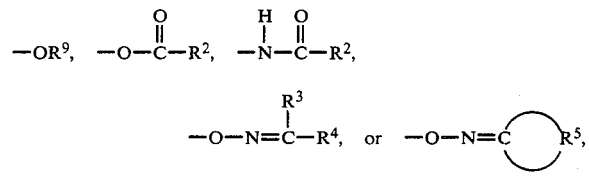

wherein
R$^9$ represents C$_1$–C$_3$ alkyl,
R$^2$ represents H or C$_1$–C$_4$ alkyl,
R$^3$ and R$^4$ independently represent H, C$_1$–C$_4$ alkyl, C$_6$–C$_8$ cycloalkyl, or C$_6$–C$_8$ aryl,
R$^5$ represents C$_4$–C$_7$ alkylene, and
m is an integer ranging from 1 to 3, preferably 2 or 3, and most preferably 1.

It should be understood that the term "nonfunctional organosilane" wherever appearing herein is used for convenience to distinguish compounds corresponding to the above formula, III (or the hydrolysis products thereof) from those compounds (or the hydrolysis products thereof) referred to herein for convenience as functional organosilanes and corresponding to the formula IV infra. Thus, although moieties defined by X in formula III are considered to be easily displaceable by reaction with water and/or alcohol and are therefore necessarily rather reactive, they are not defined herein as "functional" as this word is used in connection with the definition of a "functional organosilane" infra.

Typically, when a nonfunctional organosilane (or a hydrolysis product thereof) is utilized as part of the organosilicon-containing material (component B), a nonfunctional organosilane corresponding to formula III in which X corresponds to —OR$^9$ as defined above is employed.

Examples of organosilanes corresponding to the above formula, III, include trimethoxymethylsilane, dimethoxydimethylsilane, methoxytrimethylsilane, triethoxymethylsilane, diethoxydimethylsilane, ethoxytrimethylsilane, dimethoxydiphenylsilane, diethoxydiphenylsilane, diethoxymethylphenylsilane, ethoxydimethylphenylsilane, methoxydimethylphenylsilane, ethoxytripropylsilane, diethoxydipropylsilane, dimethoxydipropylsilane, and the like. Additional examples of the nonfunctional organosilanes include amyltriethoxysilane and triethoxysilane. Mixtures of nonfunctional organosilanes also may be used as the optional organosilicon material.

Such organosilicon materials contribute to water resistance, toughness, and stain resistance of cured films prepared from compositions of the invention incorporating these organosilicon materials (and/or hydrolysis products thereof). Trialkoxysilanes corresponding to formula III above (i.e., m equals 1, and X represents —OR$^9$) are preferred, those in which R$^8$ represents hydrogen, methyl, ethyl or phenyl being most preferred. These trialkoxysilanes are especially preferred when such organosilicon materials are employed because of the balance they provide among hydrophobicity, ease of reaction with the hydrophobic polyol, availability, and the contribution of the —OR$^9$ groups to good curing. However, the dimethyldialkoxysilanes corresponding to formula III above are less desirable than the trialkoxysilanes since it is believed that the dimethyldialkoxysilanes tend to decrease adhesion to the substrate of cured films prepared from compositions of the invention incorporating the dimethyldialkoxysilanes. The monoalkoxysilanes corresponding to formula III above (i.e., m equals 3 and X represents —OR$^9$) are the least desirable of this type of organosilicon material since they act as chain terminators in the curing reaction between the organosilicon-containing material and the hydrophobic polyol. Thus, when the monoalkoxysilanes are to be utilized in the preparation of resins of the invention, they should be used in controlled amounts.

As stated above, trialkoxysilanes corresponding to formula III such as methyltrimethoxysilane are especially preferred as the optional organosilicon material. Phenyltrialkoxysilanes or trialkoxysilanes, wherein —R$^8$ in formula III is represented by an aliphatic group containing more than about 14 carbon atoms are less desirable than methyltrimethoxysilane since they tend to decrease the ease of curing of resins of the invention. However, phenyltrialkoxysilanes often help the weatherability of films when properly cured.

When a mixture containing trialkoxysilanes and dialkoxysilanes is employed as the optional organosilicon material, the moles of trialkoxysilane to moles of dialkoxysilane can vary to provide desirable properties. The average functionality based on lower alkoxy moieties of a mixture containing the organosilicon-containing substance and nonfunctional organosilanes for preparation of a composition of the invention excluding the contribution to lower alkoxy moieties by any monoalkoxysilane which may be present in the mixture generally is greater than 2.2, preferably is greater than 2.7 and most preferably is greater than 3.3. For example,

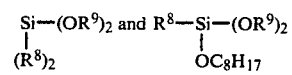

would represent difunctional compounds with respect to the lower alkoxy moieties —OR$^9$. The —OC$_8$H$_{17}$ group for example (which can be present in the nonfunctional organosilane as discussed in the following paragraph) would not contribute to the aforesaid average functionality.

Where desired, a nonfunctional organosilane, hydrolyzed nonfunctional organosilane, or mixture thereof, containing higher alkoxy, aryloxy, alkylaryloxy, aryalkyloxy, alkyloxyalkyloxy, and/or arloxyalkyloxy moieties as defined previously may be used as the optional organosilicon material. The organosilicon materials containing such moieties are believed to contribute to decreased volatility of compositions of the invention and also to water resistance of cured films which may be prepared from compositions incorporating these organosilicon materials. Organosilicon materials containing such moieties may be prepared, for example, by reacting an organosilane, hydrolyzed organosilane, or mixture thereof, with a suitable monohydric alcoholic or monohydric phenolic material so as to provide higher alkoxy, aryloxy, alkylarloxy, aryalkyloxy, alkyloxyalkyloxy, and/or aryloxyalkyloxy moieties to the organosilane. Examples of such nonfunctional organosilanes include: pentoxydimethoxymethylsilane, isopentoxydiethoxymethylsilane, 2-ethyl-2-hexoxydiethoxymethylsilane, 2-butoxyethoxydiethoxymethylsilane, diisodecyloxyethoxymethylsilane, phenoxydiethoxyphenylsilane, ethoxyphenoxydipropylsilane, tolyloxydimethoxymethylsilane, phenylethyloxy dimethoxymethylsilane, benzyloxydiethoxymethysilane, and the like. Mixtures of nonfunctional organosilanes containing such higher alkoxy, aryloxy, alkylaryloxy, arylalkyloxy, alkyloxyalkyloxy and/or aryloxyalkyloxy moieties also may be used as the optional organosilicon material.

Hydrolyzed nonfunctional organosilanes are organosilanes corresponding to the above formula, III, which have been hydrolyzed in known manner. Generally, some of the hydrolysis products are condensed to the corresponding siloxane materials which contain one or more siloxane linkages represented by formula II, above. Usually these hydrolyzed nonfunctional organosilanes are prepared in generally known manner similar to the preparation of the hydrolyzed organosilicon-containing substances such as the hydrolyzed organosilicates described above. Hydrolysis reactions for the preparation of hydrolyzed nonfunctional organosilanes may be illustrated as,

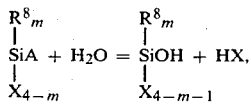

in which,

R[8] represents hydrogen, alkyl, aryl, alkylaryl, arylalkyl, or aryloxyalkyl; and X represents a hydrolyzable group as defined in formula III above; and m is an integer ranging from 1 to 3.

The above silanol products are generally condensed to produce siloxane linkages in the hydrolyzed nonfunctional organosilanes. As for the hydrolyzed organosilicates described above, it should be understood that the phrase, "hydrolyzed nonfunctional organosilane" is intended to include those hydrolyzed materials prepared from precursors which contain silicon atoms attached to hydrolyzable substituents other than the hydrolyzable groups, above represented by X in formula III, such hydrolyzable substituents including, for example, halogen such as chloro.

It is also considered to be within the scope of the present invention to use mixtures of the optional nonfunctional organosilanes and hydrolyzed nonfunctional organosilanes optionally containing higher alkoxy, aryloxy, alkylaryloxy, arylalkyloxy, alkyloxyalkyloxy and/or aryloxyalkyloxy moieties, as part of the organosilicon-containing material for preparation of compositions of the invention. Optionally the organosilicon-containing material (component B) may comprise a functional organosilane. When the organosilicon-containing material does comprise such functional organosilane, the amount of such functional organosilane generally ranges from greater than 2 to less than 50 percent, preferably less than 30, and most preferably less than 15 percent, by weight of the organosilicon-containing material. As used herein, a "functional organosilane" is intended to include materials corresponding to the following formula, IV, $$Y-G-SiX_3, \qquad (IV)$$

wherein

G represents an organo group containing from 2 to 12 carbon atoms,

X represents

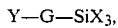
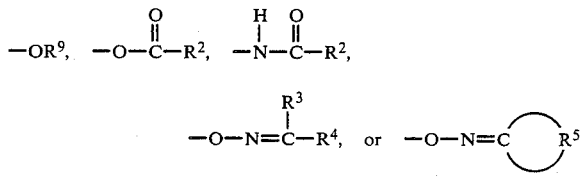

wherein

R[9] represents $C_1$–$C_3$ alkyl,

R[2] represents H or $C_1$–$C_4$ alkyl,

R[3] and R[4] independently represent H, $C_1$–$C_4$ alkyl, $C_6$–$C_8$ cycloalkyl or $C_6$–$C_8$ aryl, R[5] represents $C_4$–$C_7$ alkylene, and Y represents an epoxy, mercapto, isocyanato, ureido, amino, a group corresponding to

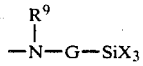

or a group corresponding to —$SiX_3$, wherein R[9] represents H or $C_1$–$C_4$ alkyl and G and X are as defined above.

In accordance with the discussion of the distinction between nonfunctional organosilanes and functional organosilanes as these terms are used herein, groups defined by Y above are considered to be the "functional" groups encompassed by the term "functional organosilane". Some examples of functional organosilanes include gamma-aminoproyltriethoxysilane, beta-aminoethyltriethoxysilane, gamma-mercaptopropyltriethoxysilane, and ureidopropyltriethoxysilane. It will be appreciated by those skilled in the art that functional organosilanes containing mutually reactive functional groups such as 1,2-epoxy and amino, or amino and isocyanato, etc. or groups defined by Y above which are reactive with groups defined by X above should be employed in controlled amounts to prepare compositions of the present invention so as to avoid gelation or high viscosity products.

Additionally, if an unhydrolyzed aminoalkylsilane (i.e., Y represents amino in formula IV above) is employed in the organosilicon-containing material, it generally will be present in an amount of less than 10 percent by weight, preferably less than 5 percent by weight, and most preferably in a catalytic amount of less than 2 percent by weight based on the total weight of the organosilicon-containing material. A distinct advantage of the present invention is that cured coatings having good film properties such as water resistance, hardness, gloss and chemical resistance can be prepared from compositions of the present invention which do not contain substantial amounts of, and preferably none of, the more costly materials such as the aminoalkylsilanes. Additionally the presence of aminoalkylsilanes in such compositions, probably at least in part because of the possible participation of the amino group in reactions such as transamidation or aminolysis, tend to promote both instability in one pack compositions containing aminoalkylsilanes and also tend to make the curing characteristics of compositions which have been stored for various periods of time, particularly at temperatures above room temperature, undesirably unpredictable.

It is to be understood that mixtures or hydrolyzed and condensed mixtures of (1) the organosilicon-containing substance, hydrolyzed organosilicon-containing substance or mixtures thereof optionally containing higher alkoxy, aryloxy, alkylaryloxy, arylalkoxy, alkyloxyalkyloxy and/or aryloxyalkyloxy moieties with, (2) the optional nonfunctional organosilanes, hydrolyzed nonfunctional organosilanes and mixtures thereof optionally containing higher alkoxy, aryloxy, alkylaryloxy, arylalkyloxy, alkyloxyalkyloxy, and/or aryloxyalkyloxy moieties, and (3) the optional functional organosilanes, hydrolyzed functional organosilanes and mixtures thereof may be employed as the organosilicon-containing material for preparation of the compositions of the instant invention.

Although the incorporation of the nonfunctional and/or functional organosilanes (and/or the hydrolysis and cohydrolysis products thereof) in the organosilicon-containing material may be desirable for some purposes, these materials tend to be costly. Surprisingly, it has been found that cured compositions of the invention having good properties may be prepared from the compositions of the invention wherein the amount of such nonfunctional and/or functional organosilanes has been minimized in the silicon-containing material for preparation of the composition. For example, coating compositions which cure to films having good properties such as gloss, hardness, and water resistance may be prepared from compositions of the invention wherein the organosilicon-containing material comprises from 50 to 100 percent by weight, based on the total weight of the organosilicon-containing material, of the organosilicon-containing substance at least a portion of which is hydrolyzed.

In one procedure for preparing a composition of the invention, depending on the choice of hydrophobic polyol and organosilicon-containing material, the two components may be simply mixed together at room temperature.

In a second procedure, an unhydrolyzed organosilicon-containing substance is cohydrolyzed at room temperature with a nonfunctional organosilane and optionally a functional organosilane, utilizing a controlled amount of water and an acid catalyst such as hydrochloric acid. Following the cohydrolysis, the organosilicon-containing material and hydrophobic polyol are mixed at room temperature to form a homogeneous composition of the invention. It has been found that organosilicon-containing material containing cohydrolysis products of the organosilicon-containing substance and nonfunctional organosilane and optionally functional organosilane advantageously has enhanced compatibility with hydrophobic polyols. Such compositions of the invention advantageously may be utilized in high solids coating applications where low viscosity is desired and the presence of organic solvents is minimized or even eliminated.

Compositions in which an unhydrolyzed organosilicon-containing substance, optionally in combination with an unhydrolyzed and/or hydrolyzed nonfunctional and/or functional organosilane, is hydrolyzed employing a controlled amount of water in the presence of the hydrophobic polyol are considered to be within the scope of the present invention.

Since, typically, the compositions of the invention are quite fluid, it is usually not necessary, and often preferable, not to include organic solvents in the compositions of the invention particularly where a composition is to be utilized in high solids coating applications. A high solids coating composition typically contains at least 50 percent, preferably at least 60 percent, and most preferably at least 70 percent, by weight resin solids based on the weight of the composition. However, where desired, compositions of the invention may be thinned with organic solvent. Examples of organic solvents include ketones such as methyl ethyl ketone, hydrocarbons such as xylene and toluene, the mono- and dialkylethers of diethylene glycol such as diethylene glycol dibutyl ether and diethylene glycol diethyl ether, and low molecular weight alcohols such as ethanol. Water can be employed to hydrolyze an unhydrolyzed organosilicon-containing material prior to, during, or even after mixing of the organosilicon-containing material with the hydrophobic polyol.

Where water is employed in the preparation of a composition of the invention, the amount of water must be controlled because water is reactive with moieties directly bonded to silicon which are displaceable by reaction with water and/or alcohol in addition to being reactive with other corrective groups which may be present in the composition. Of course, it is to be understood that controlled amounts of water as contained, for example, in commercially available polyester polyols which can be utilized in a composition of the invention, are tolerable even where it is desired to minimize hydrolysis and condensation of the organosilicon-containing substance and water content in the composition and in fact is useful to hydrolyze at least a part of the organosilicon-containing substance, particularly where an unhydrolyzed organosilicon-containing substance is employed in preparing the composition.

The amounts by weight of the hydrophobic polyol and silicon-containing material for preparation of a composition of the invention may vary. Generally the amounts by weight of hydrophobic polyol and organosilicon-containing material are selected so that the homogeneous composition contains sufficient hydroxyl moieties from the hydrophobic polyol and sufficient moieties, directly bonded to silicon which are displaceable by reaction with water and/or alcohol, from the organosilicon-containing material that the composition can be gelled according to the specific three-step gel test described infra. Additionally, the composition is capable of self-curing (for example, without any additional crosslinkers) to a continuous film by reaction of the moieties directly bonded to silicon which are displaceable, with moisture and/or the hydroxyl moieties from the hydrophobic polyol. Typically the amount of displaceable moieties from the organosilicon-containing material ranges from 20 milliequivalents to 0.5 milliequivalents, preferably from 15 to 3 milliequivalents, and most preferably from 10 to 4 milliequivalents, per gram based on the sum of the weights of organosilicon-containing material (component B) and hydrophobic polyol (component A) utilized in preparing a composition of the invention whereas the amount of hydroxyl moieties from the hydrophobic polyol typically ranges from 0.5 to 20 milliequivalents, preferably from 3 to 15 milliequivalents, and most preferably from 4 to 10 milliequivalents, per gram based on the aforesaid sum. In the context of the present invention, 1 milliequivalent of the displaceable moieties from the organosilicon-containing material and 1 milliequivalent of hydroxyl moieties from the hydrophobic polyol each correspond to 1 milliole respectively. Also, depending on the particular choice of hydrophobic polyol and organosilicon-containing material, the ratio of equivalents of hydroxyl moieties to equivalents of the displaceable moieties from components (A) and (B) respectively in a composition of the invention will vary. However, a useful guide for choosing the appropriate ratio of milliequivalents is to choose amounts of the polyol and organosilicon-containing material so as to provide a ratio of milliequivalents of hydroxyl moieties to milliequivalents of the displaceable moieties ranging from about 1:3 to about 3:1, preferably from about 1:2 to about 2:1.

As stated previously, for some purposes, it may be desirable to incorporate moieties of the type -$OR^7$ as defined in formula I in compositions of the invention. These moieties may be provided by the organosilicon-containing material from, for example, the organosilicon-containing substance and/or a nonfunctional organosilane (including their hydrolysis products). Such moieties, —$OR^7$, can be provided for example from modification of the organosilicon-containing material with an appropriate monohydric alcohol. Such moieties may be desirable for example to modify the solubility characteristics of the organosilicon-containing material before combination with the polyol. Additionally incorporation of such moieties into a composition of the invention can be employed to additionally decrease the volatility of the composition, increase the hydrophobic character of the composition, alter the functionality of the composition with respect to the curing moieties, and to modify the characteristics of a cured film prepared from a composition of the invention.

For example, an organosilicate corresponding to formula I wherein x equals O, a hydrolyzed organosilicate, or a mixture thereof may be reacted with a monohydric alcohol, examples of which include: isobutyl alcohol, 1-phenyl-1-ethanol, sec-butyl alcohol, 2-methyl-2-butanol, 1-pentanol, neopentyl alcohol, 2-butoxyethanol, 2-hexoxyethanol, cyclohexanol, 2-methyl-2-hexanol, 2-ethyl-2-hexanol, 1-octanol, 2-octanol, 1-nonanol, 5-buyl-5-nonanol, isodecyl alcohol, 2-phenylethanol, and benzyl alcohol. The prereaction of the monohydric alcohol with the organosilicate is one means of providing higher alkoxy, aryloxy, arylalkyloxy, alkylaryloxy, alkyloxyalkyloxy, and/or aryloxyalkyloxy moieties to the silicon atoms in the silicate material. Preferably, anhydrous monohydric alcohols are employed for this purpose. The organosilicate material which has been reacted with the monohydric alcohol is then mixed with the hydrophobic polyol.

Compositions of the invention may have a wide range of viscosities. The viscosities of the resins of the invention as measured at 25° C. with a Brookfield viscometer generally range from about 50 centipoise for (neat) compositions without any added solvent or diluent up to about 5,000 centipoise for compositions to which up to 20 percent by weight, based on the weight of the composition, of a suitable solvent or diluent has been added. The compositions of the invention which are preferred for high solids coating applications typically have Brookfield viscosities at 25° C. in the absence of any added solvent or diluent (i.e., neat) ranging from about 50 to about 5,000 centipoise, most preferably from about 500 to about 4,000 centipoise.

As stated previously, a composition of the invention comprising the hydrophobic polyol and the organosilicon-containing material is homogeneous, has a relatively low volatility, and is capable of being gelled. As will be appreciated by those skilled in the art of polymer science in general, an equation commonly referred to as the Flory equation has been used as a guideline to determine if a composition containing reactive components should gel, for example, given the number of moles of each of the reactive components, the number of reactive groups on each reactive component (i.e., the functionality of each component) and the desired theoretical extent of reaction (for example, 100 percent) of one of the reactive components. However, it has been found that the Flory equation does not provide a useful guideline for predicting whether a composition containing polyol and an organosilicon-containing material will gel or not, probably because of the tendency in siloxane chemistry for the formation, for example, of six and eight membered rings which cannot easily be taken into account in the Flory equation.

Therefore, the following simple three-step procedure is given for determining whether a composition prepared from hydrophobic polyol and organosilicon-containing material will gel. If the composition does not gel as determined by the following two-step procedure, it is considered not to be within the scope of the present invention.

(Step 1) A 10-gram sample of the homogeneous composition is introduced into a 2-ounce glass jar about 15 centimeters high by 7.5 centimeters in diameter. The jar is covered with a cap. Next, the jar and its contents are heated in an oven at 300° F. (149° C.) for 120 minutes. Thereafter, the jar is removed from the oven and tilted while still at essentially the oven temperature. A gelled composition will not flow whereas an ungelled composition will flow like a liquid at oven temperature. If the composition is gelled at the end of step 1, the composition is considered to be a composition of the invention. If the composition has not gelled by the end of step 1, step 2 is performed on the ungelled composition on which step 1 has already been performed. Step 2 is the same as step 1 except that 0.5 gram of stannous octoate is introduced into the sample before the precedure of step 1 is repeated and a vent hole is punched in the cap and covered with a piece of masking tape. If the composition is gelled at the end of step 2, it is considered to be a composition of the invention. If the composition has not gelled by the end of step 2, step 3 is performed on the ungelled composition on which step 2 has already been performed. Step 3 is the same as step 2 except that no additional catalyst is added and the temperature is 400° F. (204° C.). If the composition is gelled at the end of step 3, it is to be considered a composition of the invention.

The following procedure is used herein to determine the percent by weight of solids in a composition of the invention. An 0.5-gram sample of composition is weighed onto an aluminum tray. The tray containing the sample is placed in a desiccator at 150° F. (65.6° C.) under a vacuum of 1 torr for 16 hours. The tray containing the sample is allowed to cool to room temperature under the vacuum and then reweighed. The percent by weight solids is calculated as the weight of the sample after the 16-hour heating procedure described above divided by the weight of the sample before the heating procedure times 100. For a less accurate determination of the percent by weight solids content of a composition than that described immediately above, a larger sample (for example, 5 grams) is distilled at 150° F. (65.6.° C.) under a vacuum of 1 torr for 3 hours. The percent by weight solids content is calculated as the weight of the residue after heating divided by the weight of the sample before heating times 100.

Using the procedure for determining the percent by weight solids described above, the volatility of a composition of the invention also can be determined. Compositions of the invention characterized as having "low volatility" exhibit a minimum of 50 percent by weight retention of organosilicon-containing material based on the weight of organosilicon-containing material in the composition before and after the above percent by weight solids determination. Preferred compositions show a 60 percent by weight retention, and most preferred compositions show a 70 percent by weight retention.

One-pack compositions of the invention may be storage stable for periods of at least one year in airtight containers so as to prevent the introduction of moisture into the composition. Where desired, they may be stored under dry nitrogen. Also, composition compatible materials which easily hydrolyze so as to act as scavengers for water may be combined with the one-pack composition. Examples of such easily hydrolyzable composition compatible materials include organosilicates, organosilanes, or materials such as ethylorthoformate and 2,2-dimethoxy propane. Water-scavenging amounts of organosilicates or organosilanes can be incorporated with the composition by combining them with the composition either during or after preparation. Additionally, the compositions of the invention can be stabilized by using trace amounts of acids which act as inhibitors, examples of which include boron trifluoride etherate (a) 1 to 1 mole ratio of boron trifluoride in diethyl ether.

Additionally the compositions of the invention can be two-pack compositions with the organosilicon-containing material in one pack and the hydrophobic polyol in another pack. Where desired, compatible materials discussed above which easily hydrolyze so as to act as scavengers for water may be incorporated in the pack containing the organosilicon-containing material.

The compositions of the invention advantageously may be utilized, with or without the presence of a catalyst, as essentially a sole film former for coating various substrates such as metal, paper, wood, hardboard, plastics and the like. They may be pigmented or unpigmented and may be utilized in the presence of various generally known additives such as flow control agents, surfactants, leveling agents, anti-mar agents, fungicides, mildewcides, and the like. Examples of pigments include any of the generally known pigments including extender pigments used in the coatings and resins industry such as titanium dioxide, magnesium carbonate, dolomite, talc, zinc oxide, magnesium oxide, iron oxides red and black, barium yellow, carbon black, strontium chromate, lead chromate, molybdate red, chromoxide green, cobalt blue, organic pigments of the azo series, etc. Mixtures of pigments also may be employed.

Coating compositions utilizing the compositions of the invention may be applied to substrates using any suitable technique such as brushing, spraying, roll coating, doctor blade coating, etc.

Coating compositions utilizing the compositions of the invention typically may be cured within about 30 minutes at a temperature of about 250° F. (121° C.). Examples of catalysts which may be utilized to promote curing of the compositions include tetraisopropyl titanate, gamma-aminopropyltriethoxysilane, trifluoromethane sulfonic acid, dibutyl tin dilaurate, stannous octoate, and aluminum tris (sec-butoxide). When a catalyst is utilized to promote curing of a composition of the invention, the catalyst typically may be present in an amount ranging from about 0.1 to about 5 percent by weight based on the weight of the composition. In two-pack compositions of the invention, a catalyst may be incorporated in either or both packs where desired.

The following examples illustrate the invention and is not to be construed as limiting it to its details. As used herein, "pbw" means "parts by weight." All parts and percentages in the examples and throughout the specification are by weight unless specifically indicated otherwise.

EXAMPLES 1-7

(a) The materials in the amounts set forth in the following TABLE 1 are introduced into vessels 1 through 7. The contents of each of vessels 1-7 become homogeneous on mixing at room temperature (25° C.).

TABLE 1

| Vessel No. | 1 | 2 | 3 | — | 5 | 6 | 7 |
| --- | --- | --- | --- | --- | --- | --- | --- |
| DOW-565[1] (grams) | 25 | 25 | 35 | 15 | 35 | 25 | 25 |
| SILBOND-40[2] (grams) | 12.5 | — | — | — | — | — | — |
| A-163/A-1100/$H_2O$[3] (grams) | 12.5 | 12.5 | 7.5 | 17.5 | — | — | — |
| A-163/TEOS/$H_2O$[4] (grams) | — | 12.5 | 7.5 | 17.5 | 15 | 25 | 12.5 |
| A-163/2-ethyl-hexanol[5] | — | — | — | — | — | — | 12.5 |

[1] Primarily 2,2-bis (2-hydroxypropoxyphenyl) propane from DOW Chemical Company.

[2] A hydrolyzed and condensed tetraethoxysilane having an ethoxy content of about 65 percent by weight (corresponding to about 15.6 milliequivalents of ethoxy groups) and a silicon content of 8 percent by weight available from Stauffer Chemical Company.

[3] A hydrolyzed and condensed mixture obtained by the reaction of 1275 g (9.36 moles) of methyltrimethoxysilane (available as A-163 from Union Carbide Corp.), 225 g (1.02 moles) of gamma-aminopropyltriethoxysilane (available as A-1100 from Union Carbide Corp.) and 80.3 g (4.46 moles) of water. 324 grams of distillate is removed from the reaction mixture.

[4] A hydrolyzed and condensed mixture obtained by the reaction of 1200 g (8.81 moles) of methyltrimethoxysilane, 300 g (1.47 moles) of tetraethylorthosilicate (TEOS), and 80.3 g (4.46 moles) of water using 0.003 percent by weight of aqueous 12 N HCl as catalyst.

[5] The reaction product of 2149 g (15.78 moles) of methyltrimethoxysilane and 1849 g (14.20 moles) of 2-ethylhexanol catalyzed with 0.003 percent by weight of aqueous 12 N hydrochloric acid. Initially, the charge is heated to 90° C. under reflux and thereafter held at 90° C. for 30 minutes. The mixture is cooled to ambient temperature and allowed to stand overnight. Thereafter, the mixture is distilled at a flask temperature ranging from 70° C. to 150° C. and 720 milliliters (468 grams) of distillate is removed.

(b) Each of the vessels 1-7 containing mixtures 1-7, respectively, from part (a) immediately above is covered with a metal cap and placed for 2 hours in an oven at 300° F. (149° C.). After this period, the mixtures are observed to see if they have gelled. The results are set forth in the following TABLE 2.

TABLE 2

| Reaction Vessel No. | 1 | 2 | 3 | 4 | 5 | 6 | 7 |
| --- | --- | --- | --- | --- | --- | --- | --- |
| Gelled in 2 hours at 300° F. (149° C.) | yes | yes | yes | no | yes | yes | no |

(c) Next, 2.5 grams of stannous octoate is added to each of the ungelled mixtures in vessels 4 and 7; a hole is punched in each of the metal caps and covered with a piece of masking tape; and vessels 4 and 7 are reheated for an additional 2 hours at 300° F. (149° C.). Neither of the mixtures 4 and 7 is gelled at the end of this additional period.

(d) Thereafter, each of the ungelled mixtures 4 and 7 are reheated for two hours at 400° F. (204° C.). By the end of this additional period, each of the mixtures 4 and 7 is gelled.

(e) A sample of each of the mixtures from vessels 1, 2, 5, 6 and 7 (prior to conducting the gel test described in parts b, c, and d immediately above) is drawn down on a steel panel to a wet film thickness of about 3 mils and cured for 30 minutes at 250° F. (121° C). Each of the mixtures 1, 2, 5, 6 and 7 cured to hard, glossy films having good solvent resistance.

EXAMPLE 8

(a) A flask is charged with 1200 grams (g) of methyltrimethoxysilane, 80.3 g of water, 300 g of tetraethylorthosilicate and 0.16 g of an aqueous solution containing 35 percent by weight HCl. The contents of the flask are stirred at room temperature to form a homogeneous mixture and thereafter allowed to stand for 4 days.

Next, an additional 0.16 g of the aqueous hydrochloric acid solution is added to the flask. The flask is equipped with distillation apparatus and the contents of the flask heated over a period in excess of 2½ hours to a final temperature of 100° C. over which period at total of 455 milliliters (ml, 355 g) of distillate is collected. Thereafter the contents of the flask are allowed to cool to room temperature. The resulting composition is an organosilicon-containing material containing a cohydrolysis product of the methyltrimethoxysilane and tetraethylorthosilicate.

(b) A homogeneous composition of the invention is prepared by mixing at room temperature 7.5 g of the organosilicon-containing material prepared in part (a) immediately above with 17.5 g of DOW-565 (primarily 2,2-bis (2-hydroxypropoxyphenyl) propane from DOW Chemical Company).

(c) The composition of the invention of part (b) immediately above is cured to a continuous film in an aluminum dish at 300° F. (49° C.) for 45 minutes.

What is claimed is:

1. A liquid composition useful for coating a substrate comprising a mixture of components:
   (A) at least one hydrophobic polyol; and
   (B) an organosilicon-containing material containing less than 10 percent by weight based on the total weight of said organosilicon-containing material of unhydrolyzed aminoalkylsilane comprising
      at least one organosilicon-containing substance free of functional groups attached to carbon and essentially free of alkali metal ions, having atoms bonded directly to Si all of said atoms being selected from O, N, Cl or a combination thereof, said organosilicon-containing substance additionally having moieties directly bonded to Si which are displaceable by reaction with water, alcohol or a combination thereof, wherein at least part of said organosilicon-containing substance is hydrolyzed to a compound or mixture of compounds, said compound or mixture of compounds containing a residual amount of said moieties directly bonded to Si which are displaceable;
   wherein after said components are mixed said composition is a homogeneous liquid which is capable of self curing to a continuous film by reaction, with moisture, with said hydrophobic Polyol, or with a combination thereof, of said residual moieties bonded directly to Si which are displaceable.

2. The composition of claim 1 wherein said moieties directly bonded to Si which are displaceable by reaction with water alcohol or a combination thereof are selected from the group consisting of

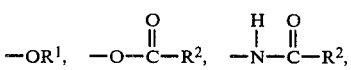

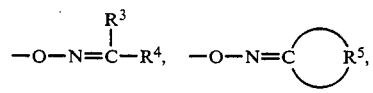

and the $C_2$ to $C_3$ residue of a 1,2- or 1,3-glycol, wherein
$R^1$ represents $C_1$–$C_7$ alkyl, $C_6$–$C_8$ cycloalkyl, $C_6$–$C_8$ aryl, or $C_3$–$C_8$ alkoxyalkyl,
$R^2$ represents H or $C_1$–$C_4$ alkyl,
$R^3$ and $R^4$ independently represent H, $C_1$–$C_4$ alkyl, $C_6$–$C_8$ cycloalkyl, or $C_6$–$C_8$ aryl, and
$R^5$ represents $C_4$–$C_7$ alkylene.

3. The composition of claim 1 wherein all atoms bonded directly to Si in said organosilicon-containing substance are oxygen atoms.

4. The composition of claim 1 wherein said moieties directly bonded to Si which are displaceable by reaction with water alcohol or a combination thereof, are lower alkoxy moieties selected from the group consisting of methoxy, ethoxy, and propoxy.

5. The composition of claim 1 wherein said hydrophobic polyol is essentially free of phenolic hydroxyl moieties.

6. The composition of claim 1 wherein at least a part of said hydrophobic polyol contains nonvicinal hydroxyl groups.

7. The composition of claim 4 wherein said lower alkoxy moieties are ethoxy moieties.

8. The composition of claim 1 wherein said hydrophobic polyol has a hydroxyl equivalent weight of from 45 to 1000.

9. The composition of claim 1 wherein said organosilicon-containing material comprises from 50 to 100 percent by weight, based on the total weight of said organosilicon-containing material, of said organosilicon-containing substance at least a portion of which is hydrolyzed.

10. The composition of claim 1 wherein said hydrophobic polyol comprises a diol.

11. The composition of claim 1 wherein said hydrophobic polyol has a hydroxyl equivalent weight of from 59 to 600.

12. The composition of claim 1 wherein said hydrophobic polyol is selected from the group consisting of simple diols, triols, and higher hydric alcohols; polyester polyols optionally modified with a fatty acid; polyether polyols; amide-containing polyols; and polyurethane polyols.

13. The composition of claim 1 having a viscosity at room temperature of from 50 centipoise absent any added solvent to aut 5,000 centipoise in admixture with up to 20 percent by weight, based on the weight of the composition, of solvent.

14. The composition of claim 1 wherein said organosilicon-containing material comprises from greater than 2 to less than 80 percent by weight, based on the total weight of said organosilicon-containing material of a nonfunctional organosilane, a hydrolyzed nonfunctional organosilane, or a mixture thereof.

15. The composition of claim 14 wherein said organosilicon-containing material comprises a hydrolyzed mixture of at least a part of said organosilicon-containing substance and at least a part of said nonfunctional organosilane, hydrolyzed nonfunctional organosilane, or mixture thereof.

16. The composition of claim 4 having a content of lower alkoxy moieties, based on the sum by weight of components (A) and (B), ranging from 20 milliequivalents per gram to 0.5 milliequivalents per gram.

17. The composition of claim 16 having a content of hydroxyl moieties, based on the sum by weight of components (A) and (B), ranging from 0.5 milliequivalents per gram to 20 milliequivalents per gram.

18. The composition of claim 1 additionally comprising an organic solvent, said composition having a percent by weight solids content of at least 50 percent by weight based on the total weight of resin solids present in said composition.

19. The composition of claim 1 which is capable of being gelled according to a gel test specifically disclosed herein.

20. A coating composition having two components (A) and (B) which prior to mixing said components comprises:
  (A) at least one hydrophobic polyol; and
  (B) an organosilicon-containing material containing less than 10 percent by weight based on the total weight of said organosilicon-containing material of unhydrolyzed aminoalkylsilane comprising
    at least one organosilicon-containing substance free of functional groups attached to carbon and essentially free of alkali metal ions, having atoms bonded directly to Si all of said atoms being selected from O, N, Cl or a combination thereof, said organosilicon-containing substance additionally having moieties directly bonded to Si which are displaceable by reaction with water, alcohol or a combination thereof, wherein at least part of said organosilicon-containing substance is hydrolyzed to a compound or mixture of compounds said compound or mixture of compounds containing a residual amount of said moieties directly bonded to Si whch are displaceable;
    wherein after said components are mixed said composition is a homogeneous liquid which is capable of self curing to a continuous film by reaction, with moisture, with said hydrophobic polyol or with a combination thereof, of said residual moieties bonded directly to Si which are displaceable.

21. The coating composition of claim 1 wherein after said components are mixed said homogeneous liquid composition is capable of being gelled according to a gel test specifically disclosed herein.

22. The composition of claim 1 wherein said organosilicon-containing material additionally comprises a nonfunctional organosilane, a hydrolyzed nonfunctional organosilane, or a mixture thereof.

23. The composition of claim 1 wherein said organosilicon-containing material additionally comprises a functional organosilane, a hydrolyzed functional organosilane, or a mixture thereof which functional organosilane is not an aminoalkylsilane.

24. The composition of claim 14 wherein said organosilicon-containing material additionally comprises from greater than 2 to less than 50 percent by weight based on the total weight of said organosilicon-containing material of a functional organosilane, a hydrolyzed functional organosilane, or a mixture thereof.

25. The composition of claim 24 wherein said organosilicon-containing material comprises a hydrolyzed mixture of at least a part of said organosilicon-containing substance; at least a part of said nonfunctional organosilane, hydrolyzed nonfunctional organosilane, or mixture thereof; and at least a part of said functional organosilane, hydrolyzed functional organosilane, or mixture thereof.

26. The coating composition of claim 20 wherein said organosilicon-containing material additionally comprises a nonfunctional organosilane, a hydrolyzed nonfunctional organosilane, or a mixture thereof.

27. The coating composition of claim 20 wherein said organosilicon-containing material additionally comprises a functional organosilane, a hydrolyzed functional organosilane or a mixture thereof, which functional organosilane is not an aminoalkylsilane.

* * * * *

UNITED STATES PATENT AND TRADEMARK OFFICE
CERTIFICATE OF CORRECTION

PATENT NO.   : 4,613,451

DATED        : September 23, 1986

INVENTOR(S)  : Wen-Hsuan Chang et al

It is certified that error appears in the above-identified patent and that said Letters Patent is hereby corrected as shown below:

Column 23, line 45, claim 1; "Polyol" should read "polyol";

Column 23, line 50, claim 2; insert a comma after "water";

Column 24, line 6, claim 4; insert a comma after "water".

Signed and Sealed this

Thirteenth Day of October, 1987

Attest:

DONALD J. QUIGG

Attesting Officer

Commissioner of Patents and Trademarks